March 31, 1942.  C. T. BROSHKEVITCH  2,278,363
CONVEYER MOUNTING
Filed July 11, 1939  2 Sheets-Sheet 1

INVENTOR:
CONSTANTINE T. BROSHKEVITCH,
BY
HIS ATTORNEY.

March 31, 1942.    C. T. BROSHKEVITCH    2,278,363
CONVEYER MOUNTING
Filed July 11, 1939    2 Sheets-Sheet 2
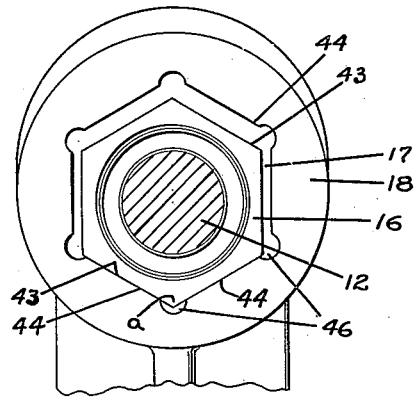
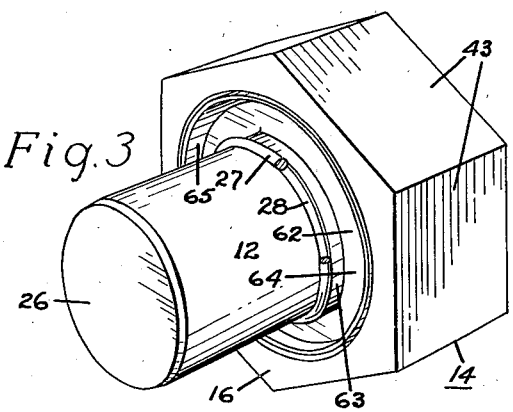
Fig. 3
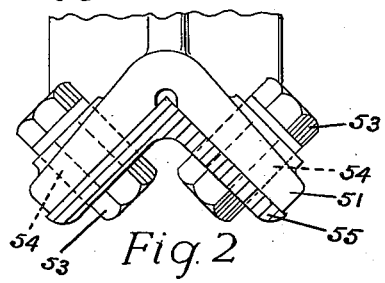
Fig. 2
Fig. 4
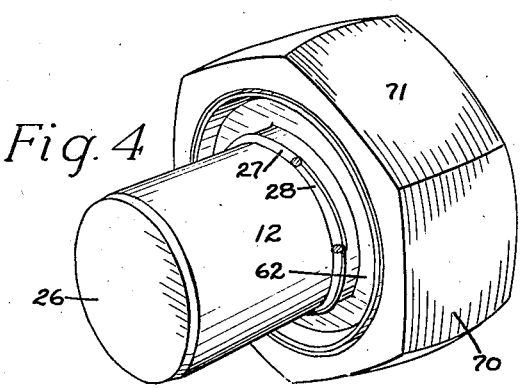
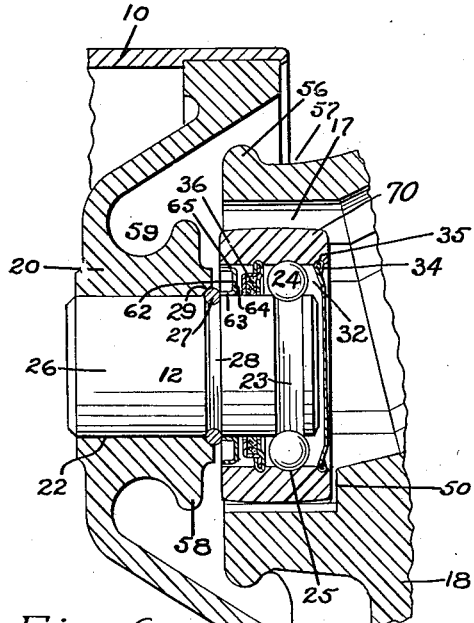
Fig. 6
Fig. 5
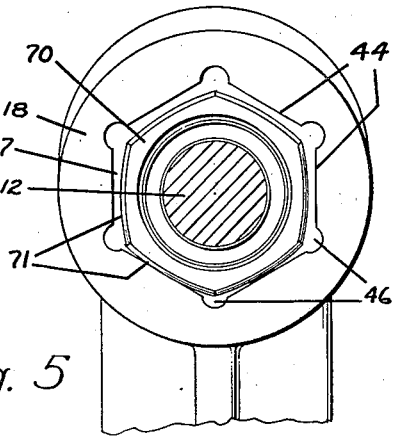
INVENTOR:
CONSTANTINE T. BROSHKEVITCH,
BY
HIS ATTORNEY.

Patented Mar. 31, 1942

2,278,363

UNITED STATES PATENT OFFICE 2,278,363

CONVEYER MOUNTING

Constantine T. Broshkevitch, Bristol, Conn., assignor to General Motors Corporation, Detroit, Mich., a corporation of Delaware Application July 11, 1939, Serial No. 283,866

5 Claims. (Cl. 308—20)

This invention relates to conveyer mountings and particularly to antifriction bearing mountings for conveyer rolls and the like.

An object of my invention is to provide an improved and easily constructed mounting for rotatable members such as conveyer rolls. Another object is to provide a bearing mounting which demountably and non-rotatably receives an antifriction bearing in socketed relation. A further object is to provide an improved socketed bearing mounting for conveyer rolls and which permits a tilting self-aligning movement of the bearing so that the bearing may freely locate in a desired position.

To these ends and also to improve generally upon devices of the character indicated, the invention consists in the various matters hereinafter described and claimed.

In the accompanying drawings,

Figure 2 is a cross sectional view taken substantially along the line 2—2 of Figure 1 and looking in the direction of the arrows;

Figure 3 is a perspective view of the bearing;

Figure 4 is a perspective view of another embodiment of my bearing;

Figure 5 is a sectional view generally similar to Figure 2 and showing the bearing of Figure 4 in position; and Figure 6 is a fragmentary vertical section and showing the bearing of Figure 4 in operative position.

Figure 1:
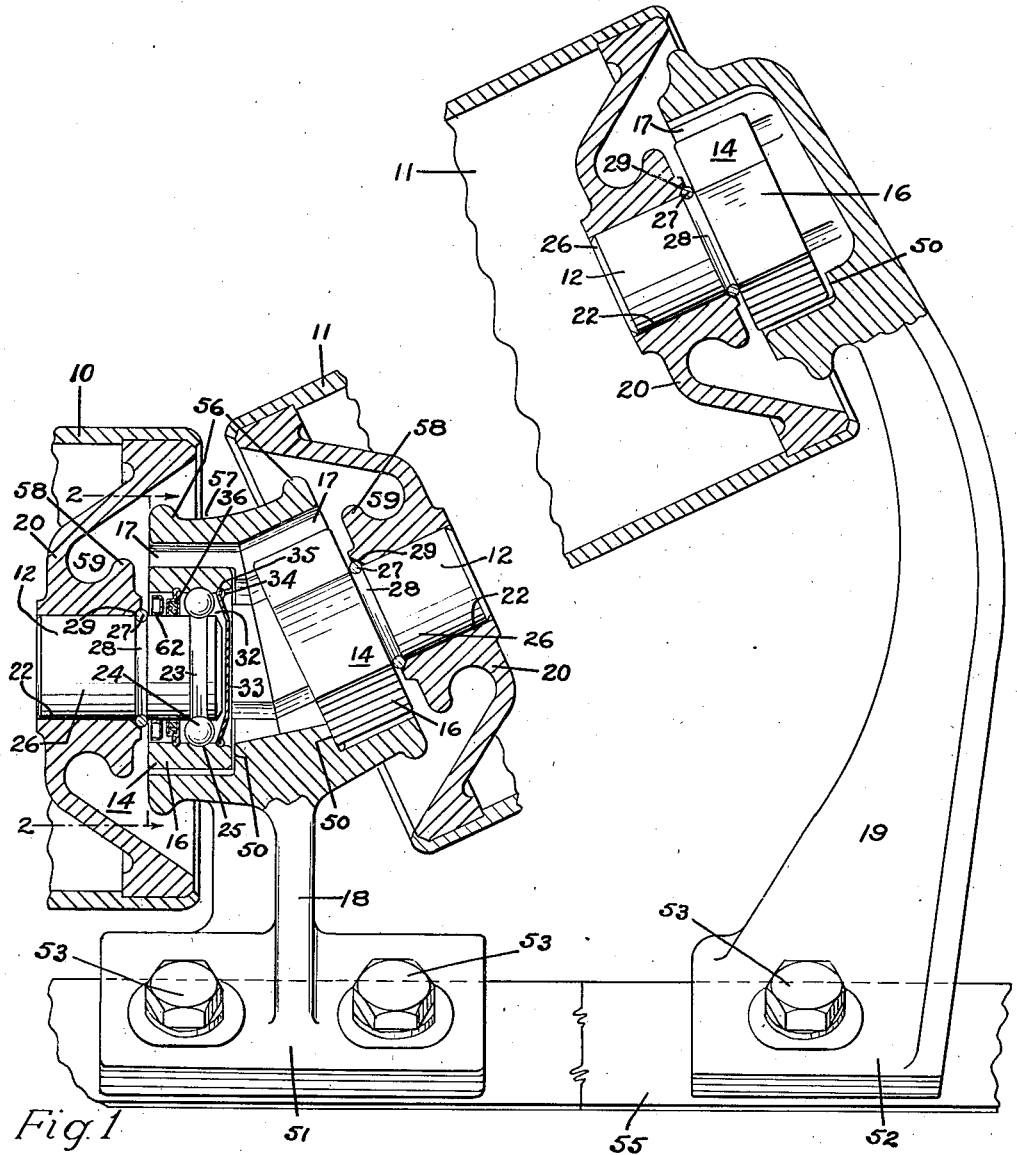
Figure 1 is a fragmentary view chiefly in longitudinal section and illustrating my invention applied to supporting conveyer rolls.

My invention is shown applied to a troughing idler roll structure for belt conveyers, wherein a substantially horizontal center roll 10 is supported between the lower ends of a pair of upwardly and oppositely inclined similar side rolls, one of which is designated at 11. The ends of each of these rolls are respectively secured on a stub shaft 12, which forms part of an antifriction bearing 14 provided with a race ring, as the outer race ring 16, removably and non-rotatably received for freely tiltable self-aligning movement in one of the sockets 17 respectively formed in an intermediate supporting bracket 18 and in an end bracket 19. Each end of the rolls 10 and 11 is provided with a head 20 that has a hub centrally bored at 22. The stub shaft 12 has one end provided with the usual ball race 23 in which roll the bearing balls 24 that are also in rolling engagement with the ball race 25 in the outer race ring 16, and the axially projecting end 26 of the shaft 12 is tightly pressed into the bore 22. A snap ring 27, seated in the ring groove 28, is wedged against the outer bevelled end 29 of the bore 22 to axially position the bearing 14 relative to the conveyer roll which it supports.

The bearing balls 24 roll in a lubricant chamber 32 between a dished end cap 33, overlying the end of the shaft 12 and having a curled-over peripheral edge 34 sealingly seated in the groove 35, and an annular seal 36 which may be generally similar to that disclosed in the United States patent to Delaval-Crow No. 2,054,580 and issued on September 15, 1936. A suitable lubricant, placed in the chamber 32 during assembly of the bearing, provides permanent lubrication for the bearing, and the end cap 33 and the seal 36 co-operate to prevent lubricant leakage and to preclude the entrance of deleterious substances into the bearing.

Each outer race ring 16 has a non-cylindrical external periphery removably socketed in a loosely interfitting non-rotatable relation in the generally similarly shaped internal peripheral contour of its supporting socket 17 so that the bearings are individually free to non-rotatably shift into self-alignment without necessitating a precision interfitting relation of parts. The outer race rings 16 and their sockets 17 are preferably shaped as generally similar equilateral polyhedrons respectively provided with the correspondingly positioned side faces 43 and 44. The junctions between the adjacent internal side faces 44 of the socket 17 are longitudinally undercut to provide the recesses 46, and one of these recesses is located in the bottom of each socket 17 with the adjacent upwardly inclined faces 44 disposed at each side thereof. The external side faces 43 on the race rings 16 are shorter than the adjacent faces 44, and when the bearing is axially entered into its socket, the vertex $a$ between two of the adjacent faces 43 will enter into unsupported relation in the bottom recess 46, and the adjacent lower race ring faces 43 will rest on the corresponding lower socket faces 44. These two lower socket faces 44, which extend downwardly from the horizontal and towards each other beneath the shaft 12, form a V-shaped centering recess for the race ring and constrain the remaining correspondingly located faces 43 and 44 to be located in sufficiently spaced relation to facilitate a tilting but non-rotatable movement of the race ring 16 within its socket. Each socket 17 has a shoulder 50 which limits the axial position of the bearing and which is normally sufficiently spaced from the end of the race ring 16 so that it will not restrict the necessary required tilting movement of the bearing.

The bracket 18, located between the conveyer rolls 10 and 11, has a pair of angularly disposed sockets 17 for respectively receiving the bearings 14 that support the ends of the conveyer rolls 10 and 11. The supporting brackets 18 and 19 are provided with suitable feet 51 and 52 respectively secured as by bolts 53 which pass through longitudinal slots 54 and into a support 55 so that the brackets may be slidably adjusted longitudinally of the rolls to facilitate demountably positioning the bearings 14 in their respective sockets 17.

To prevent water and foreign substances, such as dust and dirt from gaining access to the seals and to the bearing sockets, each roll head 20 is inwardly dished and overlies the annular end flanges 56 that provide an intermediate drain groove 57 on the brackets 18 between the rolls 10 and 11. Each head 20 has an annular end flange 58 adjacent one of the bearings 14, and this flange forms one side of an annular drain groove 59. Water and other deleterious substances which may fall between the ends of the rolls 10 and 11 will be drained away from the bearings 14 in the grooves 57 and 59, and an annular slinger 62 pressed over the stub shaft 12 within the bearing further prevents access of foreign material to the seal 36. This slinger 62 is generally channel-shaped in radial section with an inner peripheral wall 63 sealingly engaging the stub shaft 12, while a substantially radial wall 64 lies in spaced relation to the seal 36, and an outwardly directed annular slinger wall 65 (Fig. 6) lies in closely spaced relation to the race ring 16.

Another embodiment of my invention is shown in Figures 4, 5 and 6 wherein the outer race ring 16 is replaced by a generally similar non-cylindrical outer race ring 70. In the present instance, this race ring 70 is shown hexagonal and arranged to removably seat within the hexagonal socket 17, but the equilateral side faces 71 of the race ring 70 are also transversely and longitudinally curved or parti-spherical, thus providing a somewhat barrel-shaped contour. With this construction, the bearing may be removably and axially inserted in the socket 17 in the same manner as the outer race ring 16, and the transverse curvature of the side bearing faces 71 will facilitate a universal rocking movement of these faces 71 in contact with the two lower socketed faces 44 so that the bearings will easily assume the desired self-aligning positions in their respective sockets 17.

I claim:

1. In a device of the character indicated, a support having a socket therein, the interior of said socket being substantially defined by the plane faces of an equilateral polyhedron, and a polyhedron-shaped bearing member demountably and non-rotatably received for universally tiltable movement in said socket, said member having correspondingly disposed equilateral faces each of which is longitudinally and laterally curved, and a plurality of said curved faces lying in simultaneous rocking engagement with the correspondingly disposed plane socket faces.

2. In a device of the character indicated, a non-circular polyhedron-shaped bearing member peripherally defined by a plurality of angularly disposed parti-spherical faces, a support having a polyhedron-shaped socket demountably receiving said member, and a plurality of internally disposed plane faces on said support that define the socket and which generally correspond in position to said parti-spherical faces, whereby the member is tiltably and non-rotatably positioned in said socket; substantially as described.

3. In a device of the character indicated, an antifriction bearing having an outer race ring, a shaft rotatably supported in the race ring, a plurality of angularly disposed faces defining a substantially polyhedron-shaped periphery on said race ring, a socket loosely and removably receiving said race ring, a plurality of plane faces making the interior of said socket of a polyhedron shape generally similar to that of the race ring, and two of said plane socket faces lying beneath the shaft and being downwardly inclined towards each other to form a centering recess which constrains the race ring to take clearance with the remaining socket faces, whereby the race ring may assume a tilting but non-rotatable movement in said socket.

4. In a device of the character indicated, an antifriction bearing having an outer race ring, a shaft rotatably supported in the race ring, rolling elements between the race ring and said shaft, a plurality of angularly disposed faces defining a substantially polyhedron-shaped periphery on said race ring, a support having a socket loosely and axially receiving said race ring for non-rotatable universal movement, a plurality of angularly disposed flat faces defining the interior of said socket in a polyhedron-shaped periphery generally similar to and larger than that of said race ring, two of said flat socket faces forming a V-shaped centering recess that tiltably supports the race ring on two lower adjacent race ring faces beneath said shaft and which causes the remaining race ring faces to lie in clearance relation to said remaining socket faces, and the bottom of said V-shaped socket recess having a groove which receives the vertex formed by the two bottom race ring faces in non-supported clearance relation.

5. In a device of the character indicated, an antifriction bearing having an outer race ring, a shaft rotatably supported in the race ring, rolling elements betwetn the race ring and said shaft, a plurality of angularly disposed faces defining a substantially polyhedron-shaped periphery on said race ring, a support having a socket loosely and axially receiving said race ring for non-rotatable tilting movement, a plurality of angularly disposed flat faces defining the interior of said socket in a polyhedron-shaped periphery generally similar to and larger than that of said race ring, two of said flat socket faces forming a V-shaped centering recess that tiltably supports the race ring on two lower adjacent race ring faces beneath said shaft and which causes the remaining race ring faces to lie in clearance relation to said remaining socket faces, and the bottom of said V-shaped socket recess having a groove which receives the vertex formed by the two bottom race ring faces in non-supported clearance relation.

CONSTANTINE T. BROSHKEVITCH.